US008600184B2

(12) United States Patent
Guo et al.

(10) Patent No.: US 8,600,184 B2
(45) Date of Patent: Dec. 3, 2013

(54) SYSTEM AND METHOD FOR REDUCING ARTIFACTS IN IMAGES (75) Inventors: Ju Guo, Los Angeles, CA (US); Marco Antonio Vasquez, Los Angeles, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 910 days.

(21) Appl. No.: 12/522,726

(22) PCT Filed: Jun. 12, 2007

(86) PCT No.: PCT/US2007/013739
§ 371 (c)(1),
(2), (4) Date: Jan. 7, 2010

(87) PCT Pub. No.: WO2008/088370
PCT Pub. Date: Jul. 24, 2008

(65) Prior Publication Data
US 2010/0119173 A1 May 13, 2010

Related U.S. Application Data (60) Provisional application No. 60/880,650, filed on Jan. 16, 2007.

(51) Int. Cl.
G06K 9/00 (2006.01)

(52) U.S. Cl.
USPC .......................................................... 382/252

(58) Field of Classification Search
USPC ......... 382/232, 251, 252, 266, 268, 275, 283; 358/3.03, 3.04, 3.05
See application file for complete search history.

(56) References Cited

U.S. PATENT DOCUMENTS 5,757,976 A 5/1998 Shu
5,911,007 A * 6/1999 Miyake .......................... 382/233

(Continued)

FOREIGN PATENT DOCUMENTS

CN 1713689 12/2005
EP 0707410 4/1996

(Continued)

OTHER PUBLICATIONS

Sin-Ming Cheunt et al, "A techique for lossy compresssoin of error-diffused halftones" Multimedia and Expo, 2004 ICME 2004 IEEE International Conference onTaipei, Taiwan, Jun. 27-30, vol. 2, Jun. 27, 2004 pp. 1083-1086.

(Continued)

Primary Examiner — Phuoc Tran
(74) Attorney, Agent, or Firm — Robert D. Shedd; Vincent E. Duffy; James McKenzie (57) ABSTRACT A system and method of the present disclosure provides a block, or region, based error diffusion process for reducing artifacts in images. The system and method allows for the generation and the control of the spatial frequency of a masking signal, e.g., noise, in a way that it can be easily passed through the compression process. The system and method provides for selecting a block size of pixels of the image, adding a masking signal to the image, determining a quantization error for at least one block in the image, and distributing the quantization error to neighboring blocks in the image to mask artifacts in the image. An output image is then encoded with a compression function.

15 Claims, 5 Drawing Sheets

(56) References Cited

U.S. PATENT DOCUMENTS

| | | | |
|---|---|---|---|
| 6,201,612 | B1 | 3/2001 | Matsushiro et al. |
| 6,501,566 | B1* | 12/2002 | Ishiguro et al. ............. 358/3.05 |
| 6,668,100 | B1* | 12/2003 | Kaburagi et al. ............ 382/299 |
| 6,764,162 | B2* | 7/2004 | Biddle et al. .................... 347/37 |
| 2005/0207661 | A1 | 9/2005 | Miyagi et al. |
| 2011/0075729 | A1* | 3/2011 | Dane et al. .............. 375/240.03 |

FOREIGN PATENT DOCUMENTS

| | | |
|---|---|---|
| JP | 8228288 | 9/1996 |
| JP | 10271331 | 10/1998 |
| JP | 2003309724 | 10/2003 |
| JP | 2005269577 | 9/2005 |

OTHER PUBLICATIONS

Allebach J P et al, "Memory efficient error diffusion" IEEE Transactions on Image Processing, vol. 12, No. 11, Nov. 1, 2003, pp. 1352-1366.

Memon N D et al, "Image processing for halftones focusing on inverse halftoning, compression, and watermarking" IEEE Signal Processing Magazine, vol. 20, No. 4, Jul. 1, 2003 pp. 59-70.

Search Report dtd Jul. 1, 2008.

* cited by examiner

SYSTEM AND METHOD FOR REDUCING ARTIFACTS IN IMAGES

This application claims the benefit under 35 U.S.C. §365 of International Application PCT/US2007/013739, filed Jun. 12, 2007, which was published in accordance with PCT article 21(2) on Jul. 24, 2008, in English and which claims the benefit under 35 U.S.C. §119 of a provisional application 60/880,650 filed in the United States on Jan. 16, 2007.

TECHNICAL FIELD OF THE INVENTION

The present disclosure generally relates to digital image processing and display systems, and more particularly, to a system and method for reducing artifacts in images.

BACKGROUND OF THE INVENTION

Due to the large size of the data files required to produce a high quality representation of a digitally sampled image, it is common practice to apply various forms of compression to the data file in an attempt to reduce the size of the data file without adversely affecting the perceived image quality. Various well-known techniques and standards have evolved to address this need. Representative of these techniques is the Joint Photographic Experts Group (JPEG) standard for image encoding. Similar to JPEG, but with the addition of interframe encoding to take advantage of the similarity of consecutive frames in a motion sequence is the Moving Pictures Expert Group (MPEG) standard. Other standards and proprietary systems have been developed based on wavelet transforms.

In the process of a commercial movie DVD/HD-DVD release, a digital image that is scanned from conventional film, or from computer animated movie, typically has 10-bit data and, in certain applications, up to 16-bit data. The data is required to be converted to an 8-bit YUV format for compression. Due to the reduction of bit depth precision, banding artifacts often show up in the areas of the image, or images, with smooth color change. Dithering and error diffusion algorithms are commonly used to reduce the banding artifacts. In most dithering algorithms, a digital signal with high spatial frequency is added to the image to mask out the banding effect. However, the compression inside a DVD/HD-DVD is a lossy compression that removes signals with high spatial frequency. Therefore, the banding artifacts frequently show up after compression even if the banding is masked out by a dithering process before the compression.

The traditional approach for dithering or color depth reduction is for display applications and printing service. Since the dithering is the last step in the processing chain, added high spatial frequency is well preserved and serves the purpose of masking the banding effect when the color depth is reduced. Error diffusion is another common approach, where a quantization error is distributed around the neighboring pixels to generate masking effects and preserve overall image intensity. However, these approaches fail to consider the effect of a lossy compression, such as like MPEG1,2,4 or H.264, which tend to reduce or truncated the high frequency signal. Therefore, most of the error diffusion approaches will decrease the bit rate efficiency in the compression process, since a compression encoder will use a number of bits to represent the added quantization error and have fewer bits to represent the image. Meanwhile, the banding artifacts are prone to show up after the compression since the masking signal has been reduced or truncated.

Therefore, a need exists for techniques for reducing artifacts in images where the artifacts will remain reduced or suppressed after a lossy compression process. Furthermore, a need exists for techniques that will reduce artifacts in images while maintaining high bit rate efficiency.

SUMMARY

A system and method of the present disclosure provides a block, or region, based error diffusion algorithm for reducing artifacts in images. The system and method allows for the generation and control of the spatial frequency of a masking signal, e.g., noise to be applied to an image, in a way that it can be easily passed through the compression process. The block-based error diffusion method generates a dithering signal with low to medium spatial frequency response that can for the most part survive the compression process, for example, for a given block of an image, the same noise can be used for each pixel inside the block and thus the noise pattern's spatial frequency will be low inside the block, which reduces the overall spatial frequency of the noise in the whole image. The system and method also demonstrates that the peak signal to noise ratio (PSNR) is improved for the compression with the same bit rate, i.e., improves the coding efficiency in the compression. Furthermore, the block-based error diffusion algorithm reduces the banding artifacts in the commercial DVD/HD-DVD release process, especially for animated films where banding artifacts are prominent in the image area with smooth color transition.

According to one aspect of the present disclosure, a method for reducing artifacts in an image is provided including selecting a block size of pixels of the image; adding a masking signal to the image; determining a quantization error for at least one block in the image; and distributing the quantization error to neighboring blocks in the image to mask artifacts in the image.

In one aspect, the masking signal is a noise signal.

In another aspect, the method further comprises, after the distributing step, encoding the image with a compression function. The compression function is lossy compression such as MPEG 1, 2, 4, h.264, etc.

In a further aspect, the determining the quantization error step includes truncating each pixel in the at least one block; determining a quantization error for each pixel; and summing the quantization error of each pixel in the at least one block.

According to another aspect of the present disclosure, a system for reducing artifacts in images is provided. The system includes a signal generator configured for generating a masking signal to be applied to an image; a block selector configured for selecting a block size of pixels of the image; and an error diffusion module configured for determining a quantization error in at least one block of the image and for distributing the error to neighboring blocks to reduce artifacts in the image.

In a further aspect, the system includes an encoder configured for encoding the image with a compression function.

In another aspect, the error diffusion module further includes an error distribution module configured to distribute a portion of the quantization error to neighboring blocks based on a weighting coefficient. The error distribution module is further adapted to distribute the quantization error in a causal manner.

According to a further aspect, a program storage device readable by a machine, tangibly embodying a program of instructions executable by the machine to perform method steps for reducing artifacts in an image is provided, the method including selecting a block size of pixels of the image; adding a masking signal to the image; determining a quantization error for at least one block in the image; distributing the quantization error to neighboring blocks in the image to mask artifacts in the image; and encoding the image with a compression function.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

A system and method of the present disclosure provides a block, or region, based error diffusion algorithm for reducing artifacts in images. The system and method allows for the generation and control of the spatial frequency of a masking signal, e.g., noise, in a way that it can be easily passed through the compression process. The block-based error diffusion algorithm generates a dithering signal with low to medium spatial frequency response that can for the most part survive the compression process. The system and method also demonstrates that the peak signal to noise ratio (PSNR) is improved for the compression with the same bit rate, i.e., improves the coding efficiency in the compression.

In conventional pixel-based methods, each pixel's quantization error is distributed to its neighboring pixels while in the block based approach of the present disclosure, a quantization error is calculated from each block and distributed to its neighboring block. The block-based method provides ways of controlling the spatial frequency of added quantization errors by block size and the error distribution inside each block. For a given block of an image, the same noise can be used for each pixel inside the block and thus the noise pattern's spatial frequency will be low inside the block, which reduces the overall spatial frequency of the noise in the whole image. By adding error diffusion noise with desired spatial frequency response on a block basis, the reduction of artifacts will be preserved better in the lossy compression of the downstream processing than in pixel-based methods.

Figure 1:
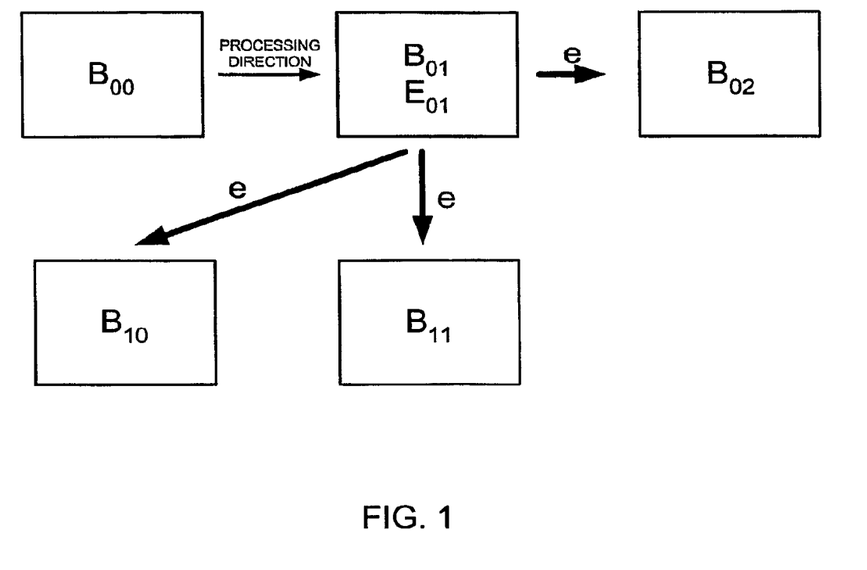
FIG. 1 is a flow diagram illustrating a block-based error diffusion method according to an aspect of the present disclosure.

Referring to FIG. 1, the overall flow for the system and method of the present disclosure is illustrated. An image to be compressed is acquired by various known means. It is to be appreciated that the image may be a single still frame digital image or one digital image in a sequence of images from a motion picture or film. The image is divided into a number of blocks, e.g., $B_{m,n}$ where m, n represent the block index. A masking signal, e.g., a noise signal, is added to the image. A truncating function is performed on each block in the image to reduce the bit depth of the pixels in the block. Quantization errors are determined for pixels in each block and the summation of all the errors produces a block quantization error, E. The block quantization error E is then distributed to each of the neighboring blocks by a weighting factor, and each pixel of the neighboring block is transformed into a new value by the distributed error, which will mask banding artifacts and will survive compression. Since the processing of the present disclosure is a causal process, the blocks will be processed in sequence according to the processing direction shown in FIG. 1. The process will start with a first block, e.g., $B_{00}$. Block $B_{00}$ is first processed with quantization and error diffusion, and then block $B_{01}$ is processed. In the processing of block $B_{01}$, E is the total quantization error of block $B_{01}$. "e" is a partial of the total quantization error E that is distributed to its neighboring blocks, e.g., $B_{10}$, $B_{11}$, $B_{02}$. The errors distributed to each neighboring block may be different, but their summation is equal to the total quantization error, E. Block $B_{02}$ is processed after the errors from previous processing blocks are added, e.g., from block $B_{01}$. Since the processing is a causal process, the processing will flow in one direction and will never add error back to the blocks processed. As known by those skilled in the art, a causal process or system is a process with output and internal states that depends only on current and previous input values.

Figure 2:
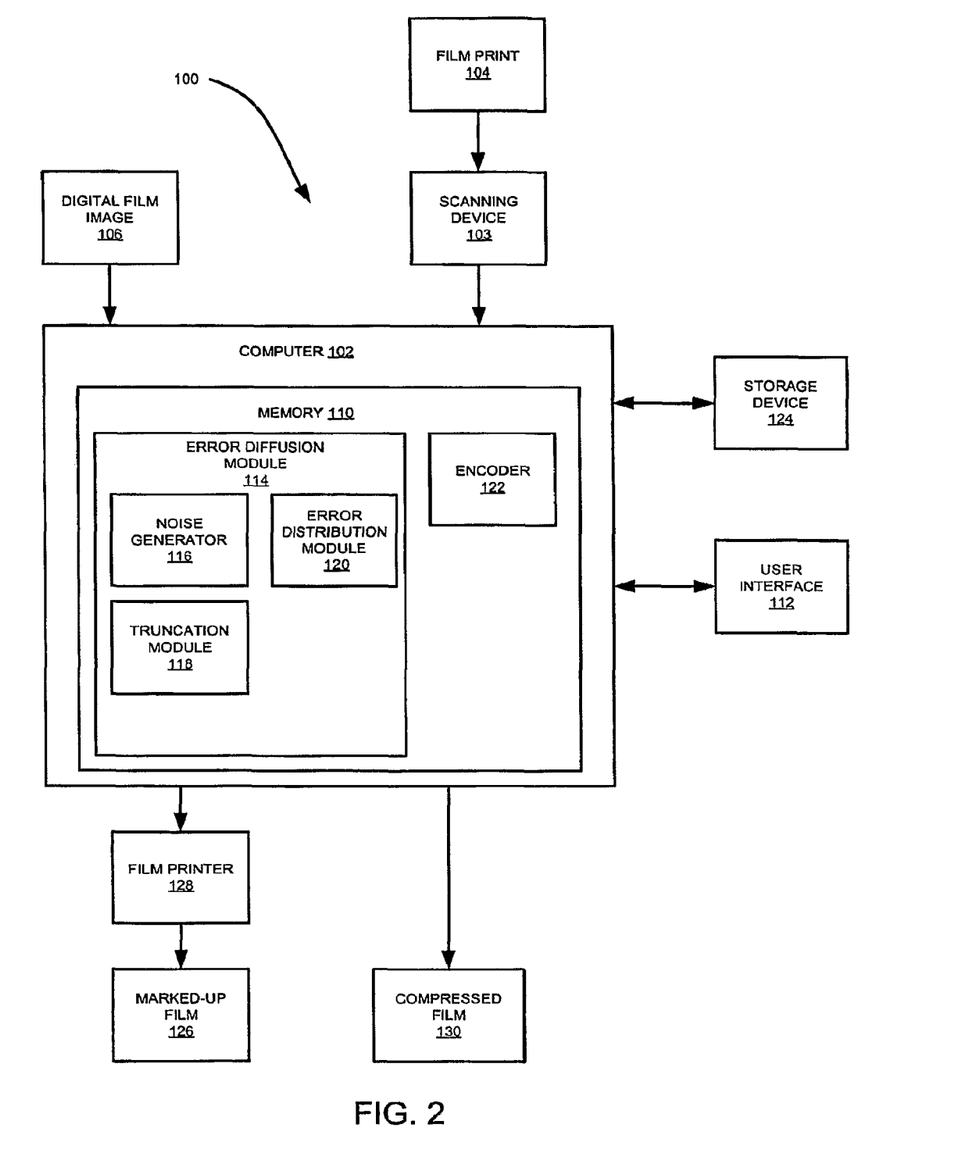
FIG. 2 is an exemplary illustration of a system for reducing artifacts in images according to an aspect of the present disclosure.

Referring now to FIG. 2, exemplary system components according to an embodiment of the present disclosure are shown. A scanning device 103 may be provided for scanning film prints 104, e.g., camera-original film negatives, into a digital format, e.g. Cineon-format or SMPTE DPX files. The scanning device 103 may comprise, e.g., a telecine or any device that will generate a video output from film such as, e.g., an Arri LocPro™ with video output. Alternatively, files from the postproduction process or digital cinema 106 (e.g., files already in computer-readable form) can be used directly. Potential sources of computer-readable files are AVID™ editors, DPX files, D5 tapes etc.

Scanned film prints are input to a post-processing device 102, e.g., a computer. The computer is implemented on any of the various known computer platforms having hardware such as one or more central processing units (CPU), memory 110 such as random access memory (RAM) and/or read only memory (ROM) and input/output (I/O) user interface(s) 112 such as a keyboard, cursor control device (e.g., a mouse, joystick, etc.) and display device. The computer platform also includes an operating system and microinstruction code. The various processes and functions described herein may either be part of the microinstruction code or part of a software application program (or a combination thereof) which is executed via the operating system. In addition, various other peripheral devices may be connected to the computer platform by various interfaces and bus structures, such a parallel port, serial port or universal serial bus (USB). Other peripheral devices may include additional storage devices 124 and a printer 128. The printer 128 may be employed for printing a revised version of the film 126, e.g., a stereoscopic version of the film.

Alternatively, files/film prints already in computer-readable form 106 (e.g., digital cinema, which for example, may be stored on external hard drive 124) may be directly input into the computer 102. Note that the term "film" used herein may refer to either film prints or digital cinema.

A software program includes an error diffusion module 114 stored in the memory 110 for reducing artifacts in images. The error diffusion module 114 includes a noise or signal generator 116 for generating a signal to mask artifacts in the image. The noise signal could be white noise, Gaussian noise, white noise modulated with different cutoff frequency filters, etc. A truncation module 118 is provided to determine the quantization error of the blocks of the image. The error diffusion module 114 also includes an error distribution module 120 configured to distribute the quantization error to neighboring blocks.

An encoder 122 is provided for encoding the output image into any known compression standard such as MPEG 1, 2, 4, h.264, etc.

Figure 3:
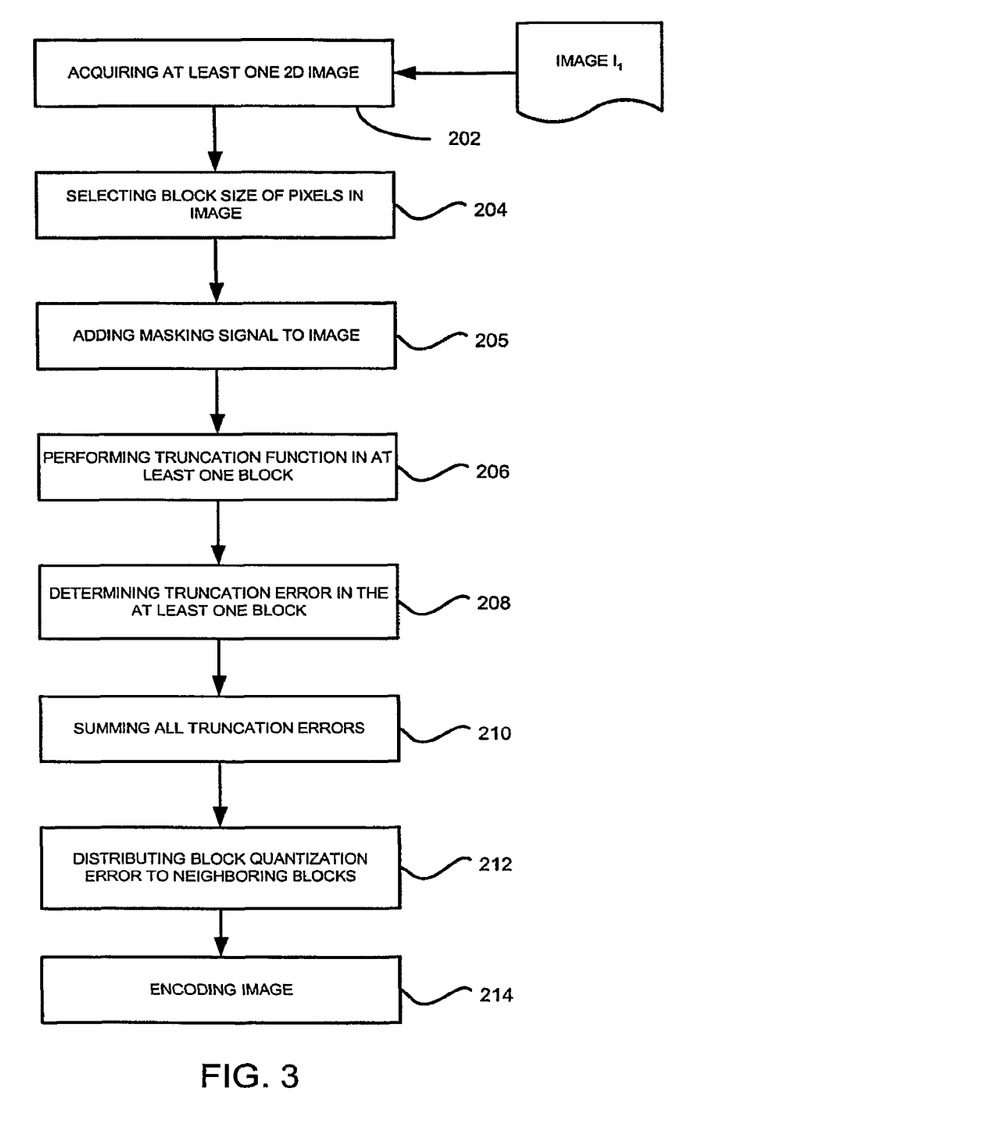
FIG. 3 is a flow diagram of an exemplary method for reducing artifacts in images according to an aspect of the present disclosure.

FIG. 3 is a flow diagram of an exemplary method for reducing artifacts in images according to an aspect of the present disclosure. Initially, the post-processing device 102 acquires at least one two-dimensional (2D) image (step 202). The post-processing device 102 acquires at least one 2D image by obtaining the digital master video file in a computer-readable format, as described above. The digital video file may be acquired by capturing a temporal sequence of video images with a digital video camera. Alternatively, the video sequence may be captured by a conventional film-type camera. In this scenario, the film is scanned via scanning device 103.

It is to be appreciated that whether the film is scanned or already in digital format, the digital file of the film will include indications or information on locations of the frames, e.g., a frame number, time from start of the film, etc. Each frame of the digital video file will include one image, e.g., $I_1$, $I_2$, ... $I_n$.

In step 204, a block size is selected. The image can be divided into any number of blocks. A block is a number of pixels contained in a rectangular region. The block is shown in the FIG. 1 as $B_{m,n}$, where m,n represent the block index. All of the blocks can have the same size, such as 2×2, 3×3, etc. The block size can also vary depending on local image attributes. The block size can be selected by an operator via the user interface 112, or it can be determined by the image size so that a constant ratio is kept for different image sizes. The error diffusion method of the present disclosure is working on the block level, as will be described below. Once the block size is selected, the block size will be kept the same for the same image.

Once the block size is determined, two functions will be performed inside each block: a truncating function and an error distribution function. Initially, in step 205, a noise signal N, e.g., a masking signal, is added to the image via noise generator 116. In step 206, a truncation function is performed on each block in the image via truncation module 118. The truncation function is employed to reduce the bit depth for each pixel in the block by dividing the bit depth value with a constant quantization factor Q, that is a power of 2. Generally, the quantization factor Q is equal to $2^x$, where x is the number of bits to be truncated. For example, for truncation from 10-bit data to 8-bit data, the constant quantization factor Q will be 4, i.e., $Q=2^2$. The truncating function is defined as the following:

$$I'_{i,j} = \frac{I_{i,j} + N_{i,j}}{Q}, \quad I_{i,j} \in B_{m,n} \qquad (1)$$

where $I_{i,j}$ is the pixel value inside the block, $N_{i,j}$ is the signal added before the truncation by the noise generator 116, and Q is the quantization factor. $I'_{i,j}$ is the truncated pixel value. In the truncation process, there is a rounding issue to be taken care of for the pixel values. For example, if $I'_{i,j}$ is equal to 1.75, i.e., 7 ($I'_{i,j}+N_{i,j}$) divided by 4 (Q), $I'_{i,j}$ will need to be represented by an integer number. $I'_{i,j}$ can be 2 or 1 based on different rounding schemes as are known in the art.

Inside equation 1, $N_{i,j}$ is noise, e.g., white noise, and it reduces structure artifacts. Generally, $N_{i,j}$ has a random signal distribution. Via user interface 112, an operator can manually control the value range of $N_{i,j}$. By default, the value range of $N_{i,j}$ is from 0 to Q-1. By using the same noise for each pixel inside a selected block of the image, the noise pattern's spatial frequency will be low inside the block, which reduces the overall spatial frequency of the noise in the whole image. Since the spatial frequency of the noise is reduced, the noise, i.e., the masking signal, will survive the compression process and suppress artifacts during decompression.

In step 208, a quantization error is determined for each pixel inside the block as shown in equation (2) below and, in step 210, the summation of all the quantization errors produces the block quantization error $E_{m,n}$, which is distributed into the neighboring blocks based on error diffusion coefficients.

$$E_{m,n} = \sum_{i,j} (I_{i,j} - QI'_{i,j}) \qquad (2)$$

For the total block quantization error $E_{m,n}$, a portion of the quantization error e will be distributed to the neighboring blocks as determined by $$e = c(m,n)*E \qquad (3)$$

where c(m,n) is an error diffusion coefficient.

In step 212, block quantization error is distributed to the neighboring blocks via error distribution module 120. The error distribution function inside each block is defined as following:

$$I_{i,j} = I_{i,j} + w_{i,j}e, \quad I_{i,j} \in B_{m,n} \qquad (4)$$

$$w_{i,j} = \frac{1}{NM} I_{i,j} \in B_{m,n} \qquad (5)$$

where e is the total error distributed to the block $B_{m,n}$, N,M are the dimension of the block, $w_{i,j}$ is the weighting coefficients for block $B_{m,n}$. In one embodiment, the uniform distribution as shown in equation (5) is used to calculate the weighting coefficients. More complex function can be designed to calculate $w_{i,j}$, e.g., $w_{i,j}$ can be set proportional to the I(i,j).

The size of block $B_{m,n}$ determines the amount of spatial frequency that can be controlled in the error diffusion process and is chosen to achieve the best effect of masking the artifacts. However, a large block size tends to generate structured artifacts, which is not desirable in the error diffusion process. Such structured artifacts include block-boundary artifacts where 2 neighboring pixels in two different blocks will be transformed differently. $N_{i,j}$ in equation 1 is also used to destroy the potential structured artifacts with random noise inclusion. An exemplary block size of 2×2 has been found to be sufficient to process an image of 720×480 pixels (e.g., DVD resolution) with no visible block artifacts. It is to be appreciated other block sizes and image sizes may be employed with no resultant visible artifacts.

After the image has been modified by the error distribution function, the image may be saved in a memory of the post-processing device, e.g., in storage device 124. Once all the images of a particular film have been modified, the images may be encoded via encoder 122 according to any conventional compression standard, such as MPEG 1, 2, 4, h.264, etc. (Step 214). The compressed film 130 may then be stored in a storage device, e.g., storage device 124, or transferred to a removable storage device, e.g., a DVD.

Figure 4:
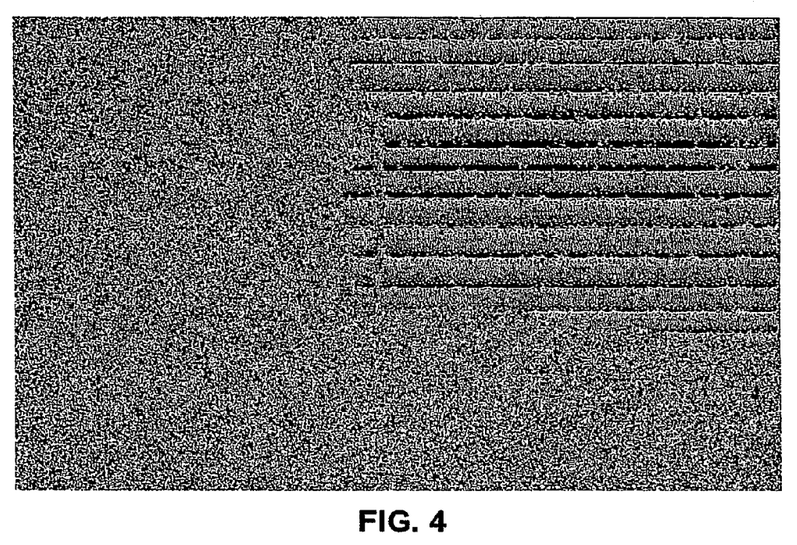
FIG. 4 is an error map for an image processed with the pixel-based error diffusion method.
Figure 5:
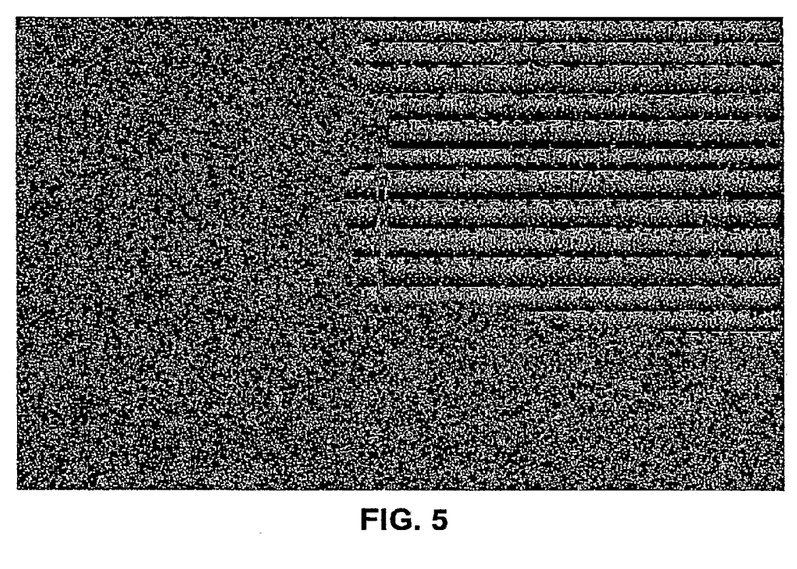
FIG. 5 is an error map for the same image processed in FIG. 4 now processed with the block-based error diffusion method in accordance with the present disclosure.

FIGS. 4 and 5 show the errors which are the difference of truncated image and the original image. FIG. 5 demonstrates that the block-based method of the present disclosure has less high spatial frequency components compared to the error map of FIG. 4 that was processed by a traditional approach, e.g., a pixel-based method.

Figure 6:
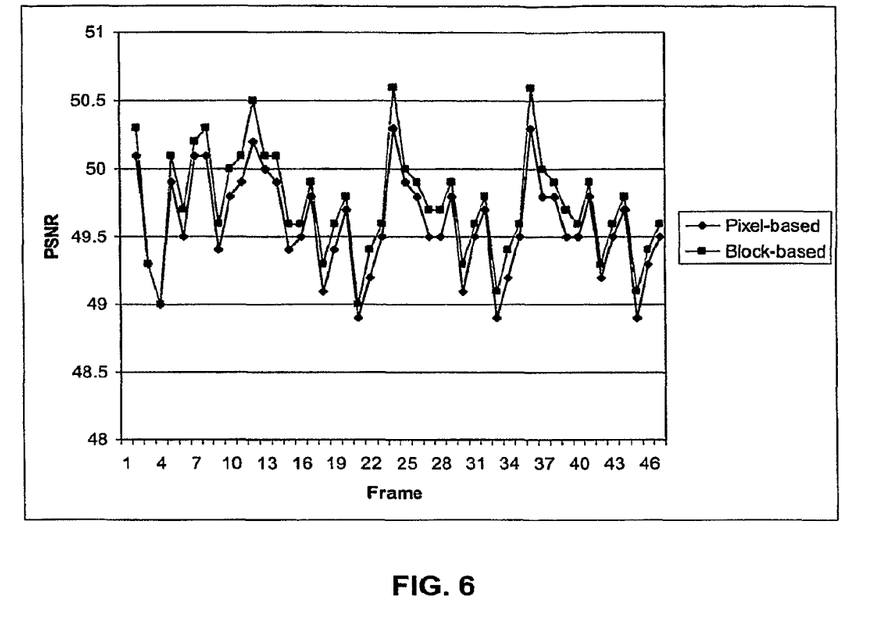
FIG. 6 is a graph illustrating the Peak Signal to Noise Ratio (PSNR) using the pixel-based error diffusion method compared to the block-based error diffusion method.

The block-based error diffusion approach of the present disclosure also improves the Peak Signal to Noise Ratio (PSNR) in the MPEG2 compression process. Referring to FIG. 6, the PSNR is improved around 0.2 to 0.5 dB compared to the pixel-based error diffusion approach. For the same bit-stream size, the block-based method of the present disclosure will give a better decoded image quality, or for the same image quality, it will use less bits.

Although the embodiment which incorporates the teachings of the present disclosure has been shown and described in detail herein, those skilled in the art can readily devise many other varied embodiments that still incorporate these teachings. Having described preferred embodiments for a system and method for reducing artifacts in images (which are intended to be illustrative and not limiting), it is noted that modifications and variations can be made by persons skilled in the art in light of the above teachings. It is therefore to be understood that changes may be made in the particular embodiments of the disclosure disclosed which are within the scope and spirit of the disclosure as outlined by the appended claims. Having thus described the disclosure with the details and particularity required by the patent laws, what is claimed and desired protected by Letters Patent is set forth in the appended claims.

What is claimed is:

1. A method for reducing artifacts in an image comprising:
   selecting a block size of pixels of the image;
   adding a masking signal to the image;
   truncating each pixel in the at least one block;
   determining a quantization error for each pixel;
   summing the quantization error of each pixel in the at least one block; and
   distributing the quantization error to neighboring blocks in the image to mask artifacts in the image;
   wherein the same masking signal is used for each pixel inside a selected block of the image, and the masking signal is a noise signal.

2. The method of claim 1, further comprising, after the distributing step, encoding the image with a compression function.

3. The method of claim 2, wherein the compression function is lossy.

4. The method of claim 1, wherein the distributing step further comprises distributing a portion of the quantization error to neighboring blocks based on a weighting coefficient.

5. The method of claim 1, wherein the distributing step further comprises distributing an equal portion of the quantization error to each of the neighboring blocks.

6. The method of claim 1, wherein the distributing step is causal.

7. The method of claim 1, wherein the block size is proportional to a size of the image.

8. A system for reducing artifacts in images, the system comprising:
   a signal generator configured for generating a masking signal to be applied to an image, wherein the same masking signal is used for each pixel inside a selected block of the image, and the masking signal is a noise signal;
   a block selector configured for selecting a block size of pixels of the image; and
   an error diffusion module configured for determining a quantization error in at least one block of the image, the error diffusion module further comprising a truncation module configured to truncate each pixel in the at least one block, determine a quantization error for each pixel, and sum the quantization error of each pixel in the at least one block; the error diffusion module further configured for distributing the error to neighboring blocks to reduce artifacts in the image.

9. The system of claim 8, further comprising an encoder configured for encoding the image with a compression function.

10. The system of claim 9, wherein the compression function is lossy.

11. The system of claim 8, wherein the error diffusion module further comprises an error distribution module configured to distribute a portion of the quantization error to neighboring blocks based on a weighting coefficient.

12. The system of claim 11, wherein the error distribution module is further adapted to distribute the quantization error in a causal manner.

13. The system of claim 8, wherein the error diffusion module further comprises an error distribution module configured to distribute an equal portion of the quantization error to each of the neighboring blocks.

14. The system of claim 8, wherein the block size is proportional to a size of the image.

15. A program storage device readable by a machine, tangibly embodying a program of instructions executable by the machine to perform method steps for reducing artifacts in an image, the method comprising:
   selecting a block size of pixels of the image;
   adding a masking signal to the image;
   truncating each pixel in the at least one block;
   determining a quantization error for each pixel;
   summing the quantization error of each pixel in the at least one block;
   distributing the quantization error to neighboring blocks in the image to mask artifacts in the image; and
   encoding the image with a compression function;
   wherein the same masking signal is used for each pixel inside a selected block of the image, and the masking signal is a noise signal.

* * * * *